United States Patent [19]

Crossley et al.

[11] 4,407,781

[45] Oct. 4, 1983

[54] METHOD OF SEPARATING MOLYBDENUM FROM URANIUM

[75] Inventors: Thomas J. Crossley, Littleton; Thomas P. Zinge, Lakewood, both of Colo.

[73] Assignee: Westinghouse Electric Corp., Pittsburgh, Pa.

[21] Appl. No.: 240,655

[22] Filed: Mar. 5, 1981

[51] Int. Cl.³ .................. C01G 43/00; C01G 39/00
[52] U.S. Cl. .................................... 423/15; 423/56
[58] Field of Search ............................. 423/15, 56

[56] References Cited

U.S. PATENT DOCUMENTS

| | | | |
|---|---|---|---|
| 1,838,767 | 12/1931 | Iredell | 423/56 |
| 3,790,658 | 2/1974 | Fox et al. | 423/15 |
| 4,092,399 | 5/1978 | Narayan et al. | 423/15 X |
| 4,304,757 | 12/1981 | Kuehl et al. | 423/15 |

OTHER PUBLICATIONS

Merritt, Robert C., "The Extractive Metallurgy of Uranium", Colorado School of Mines Research Institute, 1971, pp. 227-235, 242-243, 344-345.

Primary Examiner—Deborah L. Kyle
Assistant Examiner—Matthew A. Thexton
Attorney, Agent, or Firm—R. D. Fuerle

[57] ABSTRACT

A method is disclosed for separating uranium from molybdenum in an aqueous solution. The pH of the solution is lowered to about 1 to about 4 using an inorganic acid such as hydrochloric acid. The carbon dioxide is then removed from the solution which can be done by aeration. The pH of the solution is raised to about 9 in the presence of ammonium ions which result in the precipitation of ammonium diuranate. The precipitated ammonium diuranate may then be filtered or otherwise separated from the molybdenum which remains in the solution.

7 Claims, No Drawings

METHOD OF SEPARATING MOLYBDENUM FROM URANIUM

BACKGROUND OF THE INVENTION

In the production of uranium by solution mining of uranium containing ore bodies, molybdenum is co-extracted and must be removed from the uranium stream before the uranium is precipitated from solution. The normal procedure for removing molybdenum from the uranium solution is to absorb molybdenum on activated carbon. The molybdenum is then removed from the carbon with ammonium hydroxide to form a dilute solution of ammonium molybdate. Because of sensitive control problems the molybdenum solution from the carbon columns often contains uranium above the allowable limit. If the molybdenum solution does contain uranium above the specified limit, it is necessary to obtain additional solutions which have uranium well below the allowable limit in order to blend the two solutions so that the resulting solution will be below the allowable limit. This presents a difficult problem in storing large quantities of solution.

SUMMARY OF THE INVENTION

We have discovered a method of separating molybdenum from uranium. While present molybdenum solutions may contain as much as 200 ppm of uranium, the procedure of this invention can reduce the uranium concentration to about 5 ppm, well below the maximum allowable uranium concentration of 40 ppm. The method of this invention entirely eliminates the need to store large quantities of solution for subsequent mixing. And finally, the method of this invention efficiently and inexpensively produces a valuable molybdenum product.

DESCRIPTION OF THE INVENTION

The solution which is treated by the methods of this invention results when an in situ or above ground uranium ore is solution mined. This is accomplished by contacting the ore with a solution which dissolves the uranium. Generally, this is some type of carbonate solution containing an oxidant. The uranium containing solution, which also contains the co-extracted molybdenum, typically contains about 200 to about 500 ppm of uranium, about 19,000 to about 40,000 ppm molybdenum, and various quantities of other minerals as well as the extractants. The first step in the process of this invention is to lower the pH of the solution to less than about 4 in order to remove any carbon dioxide that is present, which would prevent the precipitation of uranium. If the pH is not lowered to at least 4, all the carbonate will not be converted to $CO_2$ for subsequent stripping, and the carbonate remaining will prevent the complete precipitation of uranium. It is usually not necessary, however, to lower the pH below about 1 as the additional benefit achieved in $CO_2$ removal is not offset by the cost of the additional acid. While any inorganic acid can be used to lower the pH, hydrochloric acid is preferred as it is usually the least expensive acid.

Once the pH has been lowered, it is necessary to remove the carbon dioxide from the solution to prevent its reconversion to carbonate ion when ammonia is subsequently added, which would prevent the precipitation of uranium. Carbon dioxide can be removed from the solution by any convenient means such as boiling the solution or air stripping, but air stripping is usually by far the least expensive method of removing the carbon dioxide. Air stripping is accomplished by sparging the solution with air for about 30 to about 90 minutes.

Once the carbon dioxide has been removed from the solution, the pH of the solution is raised to at least 9 so that the uranium can be precipitated by the addition of ammonia. If the pH is less than 9, the uranium will not be precipitated by the addition of ammonia and the molybdenum will not remain completely solubilized. While pH's higher than 9 can be used, it requires additional hydroxide with no real additional benefit. While any hydroxide, such as sodium hydroxide or potassium hydroxide, could be used to raise the pH, since the desired molybdenum product is ammonium molybdate and the desired uranium product is ammonium diuranate, it is necessary that ammonium ions be present and, therefore, the most convenient hydroxide to use is ammonium hydroxide. If sufficient ammonium hydroxide is added to raise the pH above 9, there will be an adequate quantity of ammonium ions present to precipitate all of the uranium present. If another hydroxide is used, however, it may be necessary to add additional ammonium ions in order to precipitate all of the uranium. The uranium precipitates according to the equation

$$2UO_2^{++} + 6NH_4OH \rightarrow (NH_4)_2U_2O_7 + 4NH_4^+ + 3H_2O$$

Once the precipitation reaction is complete, the precipitated ammonium diuranate (ADU) is removed from the remaining solution which contains the dissolved molybdenum. Separation can be accomplished by centrifuging or settling, but filtration is usually the most convenient and least expensive method.

The molybdenum can be recovered from the remaining solution by lowering the pH to less than about 2 which results in the precipitation of ammonium molybdate according to the equation

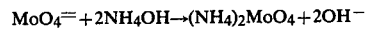

$$MoO_4^{=} + 2NH_4OH \rightarrow (NH_4)_2MoO_4 + 2OH^-$$

The ammonium molybdate precipitate can be removed by centrifuging or settling, but filtration is usually the least expensive method.

The following example further illustrates this invention:

EXAMPLE 400 ml of an eluant obtained from solution mining lamprecht ore was placed in a 600 ml beaker. The solution contained 21.8 g/l of molybdenum and 164 ppm of $U_3O_8$. Then 38 ml of concentrated HCl was added which lowered the pH to 1.0. Air was sparged through the solution for 2 hours. The pH was then adjusted to 9.0 by adding 31.1 ml of 35% ammonium hydroxide solution. The resulting cloudy solution was filtered through 0.45 micron filter paper to collect the ammonium diuranate precipitate. The remaining solution was analyzed and was found to contain 2.1 ppm $U_3O_8$ and 17.5 g/l of molybdenum. This means that over 98% of the $U_3O_8$ was removed from the initial eluant solution and only 1-2% of the molybdenum was unaccounted for. The following is an analysis which gives the average concentration ranges of various elements and ions in 20,000 gallons of solution after the uranium has been precipitated.

| | | |
|---|---|---|
| Molybdenum | g/l | 35–45 |
| U$_3$O$_8$ | ppm | 20–60 |
| Calcium | ppm | 30–100 |
| Magnesium | ppm | 1–10 |
| Sodium | ppm | 200–4,000 |
| Calcium | ppm | 30–60 |
| Iron | ppm | 1.0–5.0 |
| Manganese | ppm | 0.1–1.0 |
| Nickel | ppm | 0.1–1.0 |
| Sulfate | ppm | 6,000–10,000 |
| Chloride | ppm | 5,000–8,000 |
| Copper | ppm | 0.1–1.0 |

What is claimed is:

1. In an aqueous solution containing about 200 to about 500 ppm of uranium and about 19,000 to about 40,000 ppm molybdenum, a method of separating said molybdenum from said uranium, comprising
   (A) lowering the pH of said solution to less than about 4;
   (B) removing carbon dioxide from said solution;
   (C) raising the pH of said solution to at least about 9 and adding, as necessary, ammonium ions to precipitate ammonium diuranate; and
   (D) separating said precipitated ammonium diuranate from said solution.

2. A method according to claim 1 wherein said pH is lowered with hydrochloric acid.

3. A method according to claim 1 wherein said carbon dioxide is removed by air stripping.

4. A method according to claim 1 wherein said precipitated ammonium diuranate is separated by filtration.

5. A method according to claim 1 wherein, in step (A), the pH is lowered to between about 1 and about 4.

6. A method according to claim 1 wherein said pH is raised to at least about 9 by adding ammonium hydroxide to said solution.

7. A method according to claim 1 including the additional last step of lowering the pH to less than about 2 to precipitate molybdenum, followed by separating said precipitate from said solution.

* * * * *